R. G. OSBORNE.
BITUMINOUS COMPOSITION.
APPLICATION FILED OCT. 1, 1919.
1,347,869.
Patented July 27, 1920.
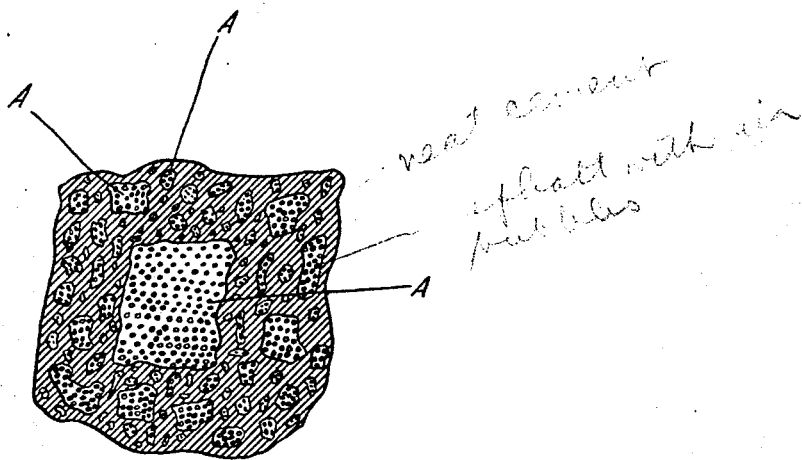
Inventor
Raymond G. Osborne
by his Attorney.

UNITED STATES PATENT OFFICE.

RAYMOND G. OSBORNE, OF LOS ANGELES, CALIFORNIA.

BITUMINOUS COMPOSITION.

1,347,869.     Specification of Letters Patent.     Patented July 27, 1920.

Application filed October 1, 1919. Serial No. 327,772.

*To all whom it may concern:*

Be it known that I, RAYMOND G. OSBORNE, a citizen of the United States, residing at Los Angeles, in the county of Los Angeles, State of California, have invented new and useful Improvements in Bituminous Composition, of which the following is a specification.

This invention relates to a composition of matter containing bituminous and cementitious substances, and to processes of making such substances; and although I do not limit my invention at all to the particular uses hereinafter described, yet it will be effective of description to set forth the invention more specifically as it appertains to roofings and other coverings or linings, etc.

The general object of the invention, at least as applied to the uses herein set forth, may be stated as follows:

To provide a material suitable for such purposes as herein described, and which will withstand expansion and contraction by heat and cold; be relatively inexpensive and of light weight; be relatively stable and not prone to flow from its proper position or shape; and to provide a suitable and efficient method and process of producing a composition which satisfies such objects.

There are many other objects and corresponding features and advantages of the invention; but such features and advantages may be best understood from a more detailed description of the composition and of its process of manufacture and also of the methods by which it may be put to said uses.

In the use of certain bituminous substances, of which asphalt is typical, for road surfacings, for roofs and roofing materials, for waterproof linings for cisterns, and for many other similar uses, there has been found a very common disadvantage in that the bituminous substance has a tendency to flow either under applied pressure or to flow by gravitation when exposed to a high temperature. It may be stated as one of the objects of my invention to provide a stable cementitious bituminous composition in which the bituminous character may predominate, and in which the proportion of bituminous substance used is higher than that which has heretofore been successfully used. That is, it is an object of my invention to provide a composition which shall retain to a very large extent the bituminous characteristics, but which, at the same time, shall have the advantageous features which I herein enumerate—chiefly the advantageous property of stability.

I accomplish such objects primarily by forming a composition in which the asphalt becomes one of the aggregates, or in fact, the aggregate of the mixture, and in which the cementitious substance (the cement) is in effect the binder. In my composition the asphalt is present in varying sized pieces or particles and these particles are bound together by a binder of cement. That is, each asphaltic particle is set in a bedding of cement; and the cement forms a cellular net work holding and embedding and cementing together all of the asphaltic particles.

I have found that such a composition as herein described has, to a very great extent, a much better stability than that of asphalt alone; and furthermore it has other advantageous qualities over the qualities of pure asphalt or similar substance, as will be hereinafter set forth.

Now asphalt and cement have coefficients of expansion quite different from each other; and a composition made up as just described, although it has many advantageous qualities, has stresses set up in it by reason of the differential heat expansion of the cement and asphalt. In order to reduce these stresses, and further in order to make a light-weight product and to make a product which is a good heat insulator, and further, in order to economize on the use of the asphaltic material, I fill the asphaltic material with air bubbles; the asphaltic material being thus more or less honeycombed with air filled voids. (Of course, it will be understood that any gas may be used; air is used merely on account of its convenience. But if fire proofing qualities are wished, carbon dioxid or similar gas might be used.) These air bubbles in the asphalt take up the expansion and contraction; the compressive and expansive qualities of the contained air compensating the differential expansion of the asphalt and cement, due to variations of temperature. The result is a composition which has all of the advantages of an asphalt-cement composition and has, in addition, the advantages of not being ruptured by changes of temperature, of having a comparatively light-weight, of being a good heat insulator, and of being economical of the use of asphaltic material.

The accompanying drawing shows in enlarged section the appearance of a typical composition made in accordance with my invention. In order to give a more definite idea of the composition itself and to give a definite idea of the method of preparing the composition, I shall proceed to a more detailed and specific description; understanding, however, that the particular procedures, and specific proportions, herein given, are not in any sense a limitation upon my invention.

In preparing the simpler form of the composition, I may break the asphalt to desired size and mix with the cement. The cement may be hydrated then or later. In any case, the resulting composition is one in which the asphaltic particles are embedded in a cellular frame-work of set cement, sufficiently rigid and strong to hold the asphalt in place and to withstand the expansion and contraction stresses. In these purposes the proportion of cement may be increased or decreased depending upon the temperature variations to which the product is subjected; the greater heat variation requiring a larger proportion of cement. And in all such cases the proportion of cement may probably be greater than it is where I use asphalt impregnated with air bubbles.

In preparing the specific form of my composition containing the aerated asphalt I find that it is convenient and practical to aerate the mass of asphalt to about twice its original volume—that is, to about half its previous specific gravity. I do this by the simple expedient of mixing air into the asphalt while it is hot and in liquid condition. I prefer, for the purposes of my composition, to use a relatively hard asphalt— one which is relatively hard and brittle at ordinary temperatures. This asphalt I heat until it is somewhat liquid and then blow and stir the air through it, filling it with air to the extent that it occupies, say, about twice the volume that it did originally. The asphalt is heated to a fluidity sufficient to take the air bubbles, but not sufficiently fluid to allow them to pass through it. The air is introduced by any suitable means, as by blowing, and the air and asphalt are agitated to break up the air into small bubbles. I then allow the aerated asphalt to cool; and upon cooling it forms again a hard but air filled mass. The air bubbles resulting in the asphalt from this method of procedure are relatively small—perhaps on the average a fiftieth of an inch or less in diameter. The specific gravity of hard asphalt varies considerably, but on the average it may be slightly heavier than water, say having a specific gravity of about 1.1. The aeration of the asphalt has thus reduced the apparent specific gravity to about 0.55.

I next take this aerated asphalt and break it into particles, which may, in the specific instance I am giving, vary from very fine up to an eighth of an inch or so in diameter. The actual size of the particles is of relatively little importance so far as the broader aspect of my invention is concerned; although, for homogeneity of results in small particles or thin layers it is desirable to have the particles relatively small, so long as they are not so small as to be too nearly the same size as the air bubbles. The size of the particles will be governed by the least dimension of the article made of the composition; and in some cases the particles may in fact be very large. The breaking of the asphalt into small particles may conveniently take place under water, or it may very conveniently take place in the presence of the cement or cement dust itself. After the asphalt is broken, or during the process of breaking it, I mix it with a certain quantity of cement, I have found that varying proportions of cement and asphalt may be used; but I may describe, for instance, a proportion of seven parts by weight of cement to three parts by weight of aerated asphalt. The asphalt may be broken in contact with the cement itself; for the purpose of preventing the broken particles of asphalt from sticking to each other; and thus the breaking of the asphalt and the mixing of the asphalt with the cement may take place simultaneously.

For some purposes I may also simultaneously mix the hydrating water with the cement at the same time that it is mixed with the asphalt; but for commercial purposes it may be desirable to make a dry mixture of cement and asphalt, to be shipped dry, and to be hydrated when used. However this is done, the result of hydration, is in all cases, to embed the asphalt in a network of cement. The cement becomes the binder for the particles of asphalt, forming a cellular structure in which the asphalt particles are embedded.

In the specific instance here given, the volumetric proportions of the ingredients is somewhat better than two volumes of asphalt to one volume of cement; and the specific gravity of the finished material is about 2.0. The characteristics of the finished material may be of course varied by either varying the proportions of cement and asphalt, or by varying the amount of aeration of the asphalt, or by both. The variation of proportions of cement and asphalt is only limited by the minimum amount of cement which may be used and still form a complete binder for the asphalt, form a sufficiently strong stable frame-work to give rigidity to the finished composition. The amount of air which may be put into the asphalt is of course only limited by the physical capacity of the asphalt to absorb and hold the air bubbles. By properly varying the amount of air in the asphalt and varying the proportion of the cement to the asphalt, the specific gravity, and also the general characteristic of the material, may be considerably varied. The material may be made so light as to float in water, or may be made of about the same specific gravity as water. This is an advantageous weight for material which may be used for linings for cisterns and the like. It is also advantageous to have the material as light as may be practicable for use in roofing.

I find this material to be waterproof; the asphalt itself being waterproof and the properly hydrated cement being also waterproof. Any unevenness or deficiency in hydration of the cement does not cause lack of waterproofness nearly as much as such deficiency does in a pure cement block; because in my composition the cement is distributed in relatively thin bodies, through which water will move with difficulty. However, I may of course waterproof the cement itself with any suitable waterproofing. I find the finished material to have a very high permanency. The cement protects the asphaltic material against the weather, etc. Some kinds of this material disintegrate on long exposure, although some other kinds, and notably coal tars and pitches do not and may therefore be used more advantageously, for some purposes, than commercial asphalt. And further the asphaltic material physically protects the cement against surface abrasion and wear.

It will be understood that wherever in this specification I speak of asphalt or asphaltic or bituminous material I do not at all mean to limit myself to the substance commercially known as asphalt, but mean to include any bituminous material, or any coal tar, pitch, resin, or material having similar physical properties; or any similar material which may be treated and handled in the manner herein described; that is, which may be impregnated with air bubbles. Likewise, when I speak of a cementitious substance, I do not necessarily limit myself to the substance commercially known as Portland cement, but may utilize any kind of cementitious or binder substance which will answer to the purposes described—which will act as a binder for the particles of the aggregate and which will act as a sort of shell or skeleton to give the material a certain amount of desired rigidity.

In the drawing I have illustrated a typical section of my material; and this drawing is indicative of how much variation in size there may be in the particles of the asphaltic material A. In the particular case illustrated the largest particles of asphaltic material happens to be about one-eighth of an inch in its smaller dimension; while the smallest asphaltic particles are perhaps not over a fiftieth of an inch in diameter. It may not actually be that each one of these smallest particles incloses an air bubble or air bubbles; and I do not conceive it to be necessary in my composition that every one of the smallest asphaltic particles inclose an air bubble or air bubbles; it being sufficient that the general run of asphaltic particles inclose such air bubbles, thereby reducing the expansion and contraction strain on the cement.

Having described a preferred form of my invention, I claim:

1. A composition of matter comprising a plastic substance impregnated with a gas, and a cementitious substance.

2. A composition of matter comprising a plastic substance impregnated with a gas set in a binder of cementitious substance.

3. A composition of matter comprising particles of plastic substance, such particles being impregnated with gas bubbles, set in in a binder of cementitious substance.

4. A composition of matter comprising particles of a yielding or semifluid substance impregnated with a gas, set in a cementitious substance.

5. A composition of matter comprising particles having the physical characteristics of a bituminous substance, the particles being impregnated with gas bubbles, set in a binder of cementitious substance, forming a cellular structure inclosing all of the bituminous particles.

6. A composition of matter comprising particles of asphalt, the particles being impregnated with air bubbles, set in a cellular structure of neat Portland cement.

In witness that I claim the foregoing I have hereunto subscribed my name this 24th day of September, 1919.

RAYMOND G. OSBORNE.

Witness:
    VIRGINIA I. BERINGER.